3,104,235
NITROGEN CURED HALOGENATED BUTYL
RUBBER COMPOSITIONS
Irving Kuntz, Roselle Park, Francis P. Baldwin, Summit, Robert M. Thomas, Mountainside, and George E. Serniuk, Roselle, N.J., assignors to Esso Research and Engineering Company, a corporation of Delaware
No Drawing. Filed Jan. 21, 1960, Ser. No. 3,741
6 Claims. (Cl. 260—41.5)

This invention relates to rubbery polymeric compositions which are halogenated copolymers of isoolefins and multiolefins and to the vulcanization of such compositions. It also relates to compositions containing halogenated copolymers of isoolefins and multiolefins together with certain nitrogen-containing organic compounds. The present invention further relates to improved methods for curing halogenated rubbery copolymers containing a major proportion, preferably at least about 85 weight percent of isoolefins and a minor proportion, preferably not more than about 15 weight percent of multiolefins with minor proportions of certain nitrogen-containing organic compounds in the absence of conventional curatives such as sulfur. These compounds fall into three general categories, the members of which may be used individually or in combination:

(1) Those compounds having at least two —$NH_2$ groups and/or those that form such groups in situ under vulcanization conditions.

(2) Those compounds having a single —$NH_2$ group and/or those that form such group in situ under vulcanization conditions.

(3) Those compounds having at least two

groups, or at least one

group and at least one —$NH_2$ group, and/or those that form such groups in situ under vulcanization conditions.

Preferably the nitrogen-containing organic compound of the present invention is selected from the group consisting of $C_4$ to $C_{24}$ aliphatic hydrocarbon amines, aromatic hydrocarbon amines, guanamines, alkylene thioureas, melamine, alkyl melamines, diamine pyridines and mixtures thereof. Concentrations of 1 to 10% based on rubbery polymer are preferred.

The present nitrogen-containing compounds are employed in the absence of conventional curing agents such as sulfur, sulfur-bearing compounds, or quinone dioxime. Though not necessary, if desired they may be compounded with various materials which, by themselves, are unable to effect cross-linking or vulcanization of halogenated butyl rubber under conventional time, e.g., less than 6 hours, and temperature, e.g., less than 400° F., conditions. An example thereof is magnesium oxide.

It is to be clearly understood that the present invention is distinguished from the use of small quantities, i.e., less than 1 weight percent of amines as vulcanization accelerators in sulfur, or other cure systems. It is indeed surprising to find that conventional vulcanization agents may be eliminated in accordance with the present invention while still obtaining a good cure. Moreover, it has been found that the present nitrogen-containing compounds give vulcanizates of excellent ozone resistance, and in some cases better tensile properties than obtained by use of conventional curing agents.

The present invention is a continuation-in-part of U.S. Serial Numbers 563,977; 563,978; 563,979 (all filed February 7, 1956), and 601,478 (filed August 1, 1956) filed in the names of Irving Kuntz, Francis P. Baldwin, Robert M. Thomas and George E. Serniuk, and all of which are now abandoned.

The halogenated rubbery copolymers cured in accordance with the invention generally are derived from hydrocarbon copolymers of a $C_4$ to $C_{14}$; preferably a $C_4$ to $C_7$ isoolefin such as isobutylene, 2-methyl butene-1 or 3-methyl butene-1 with a multiolefin of about 4 to 14, preferably about 4 to 6 carbon atoms, e.g., myrcene. Such hydrocarbon copolymers are commonly referred to in patents and in technical literature as "butyl rubber" or GR–I rubber (Government rubber-isobutylene) and, for example, is referred to as "butyl rubber" in textbook "Synthetic Rubber" by G. S. Whitby. The preparation of butyl type rubbers is also described in U.S. Patent 2,356,128 to Thomas et al. In general, as above mentioned, the rubber comprises the reaction product of an isoolefin with a conjugated diolefin such as isoprene, butadiene, dimethyl butadiene, piperylene, cyclopentadiene, cyclohexadienes, etc. The reaction product of isobutylene and isoprene is preferred.

Halogenated butyl rubber is produced by reacting the unvulcanized rubber with halogen or halogen-containing compounds so that the polymer contains at least about 0.5 weight percent of combined halogen but not more than about 3 atoms of combined bromine per double bond in the polymer where bromine is the halogen, nor more than about 1 atom of combined chlorine per double bond in the polymer where chlorine is the combined halogen. Less than 2 atoms of combined halogen is preferred.

Suitable halogenating agents which may be employed are molecular bromine or chlorine, alkali metal bromites or hypochlorites, sulfur bromides or chlorides, N-bromo- or chloro-succinimide, sulfuryl chloride, bromo- or chloro-hydantoins such as N,N-dibromo-5,5′-dimethyl hydantoin, beta-bromo- or chloro-methyl phthalimide, etc. The halogenation is advantageously conducted at about —50° C. to +150° C., preferably at about —20° C. to +100° C. for about one minute to several hours. However, the temperatures and times are regulated to halogenate the rubbery copolymer to the extent above-mentioned. The pressure may vary from about 1 to 400 p.s.i.a., atmospheric pressure being satisfactory.

The halogenation may be accomplished in various ways. One process comprises preparing a solution of the copolymer as above, in a substantially inert liquid organic solvent such as an inert hydrocarbon or halogenated derivatives of saturated hydrocarbons, e.g., hexane, mineral spirits, benzene, chlorobenzene, chloroform, carbon tetrachloride, etc., and adding thereto liquid bromine or gaseous chlorine (or other halogenating agents) which may be dissolved in an alkyl chloride, carbon tetrachloride, etc. Another method comprises blending with the solid copolymer, e.g., a solid brominating agent such as N-bromosuccinimide, the blend formed being preferably mill-mixed and heated to a temperature sufficient to halogenate the copolymer.

The halogenated copolymer formed has a viscosity average molecular weight of between 250,000 and 2,000,000 and a mole percent unsaturation between 0.5 to 25, preferably 0.6 to 5.0.

In accordance with the present invention, it has now been found that halogenated butyl rubber may be vulcanized even in the absence of sulfur and zinc oxide by curing the same with a minor portion of certain nitrogen-containing organic compounds belonging to one or more of the three categories enumerated above.

In practicing the present invention, the halogenated butyl rubber, prior to curing, is compound with preferably about 1 to 10 weight percent of at least one nitrogen-containing organic compound of the type indicated.

The organic nitrogen-containing compounds of category (1) employed in accordance with the invention include, among others, $C_4$ to $C_{24}$, preferably $C_4$ to $C_{12}$ polyfunctional amines boiling above 250° F. such as polymethylene diamines including tetramethylene diamine or hexamethylene diamine; diaminopropane; diaminocyclohexane; phenylene diamine; diethylenetriamine; triethylenetetramine; tetraethylenepentamine; benzidine and other diamino biphenyls; 4,4'-diaminodiphenylmethane; 2,6 - diaminopyridine; diaminonaphthalenes; triaminobenzenes; guanamines; methylguanamine; phenylguanamine; xylylene diamines; stearylguanamine; 3,3'-iminobispropylamine; melamine (i.e., 2,4,6-triaminotriazine); N-alkylmelamines; etc.

Suitable nitrogen-containing organic compounds of category (2) for the purposes of the present invention, include, among others, $C_4$ to $C_{24}$, preferably $C_8$ to $C_{18}$ monofunctional primary amines boiling above about 250° F. such as hexylamines; octylamines; decylamines; hexadecylamines; dodecylamines; dimethyl pentylamines; pentamethyl hexylamines; methyl octylamines; diethyl heptylamines; 9-hexadecylamine; naphthylamines; hydrogenated naphthylamines; alkyl or aryl amines such as phenylanilines; ethyl anilines; tertiary butyl anilines; other substituted anilines such as toluidines; a formaldehyde-p-toluidine reaction product; phenyl alkylamines such as alpha or beta phenylethylamine; 2,4,6-trimethylaniline, mixtures thereof, etc.

Suitable nitrogen-containing organic compounds of category (3) for the purposes of the present invention, include, among others, $C_4$ to $C_{24}$, preferably $C_4$ to $C_{12}$ polyfunctional imines boiling above about 250° F. such as N,N'-diallylmelamine; N,N'-diethylhexamethylene diamine; N,N'-dimethyl-p-phenylene diamine; N-alkyl diamines such as N-methylpentamethylene diamine; 3-alkylamino-3'-iminobisalkylamines such as N-(gamma-ethylamino propyl)-1,3-diaminopropane; N-alkylphenylenediamines such as N-methylphenylenediamine; alkylene thioureas such as 2-mercaptoimidazoline (i.e., ethylene thiourea); hexamethylene tetramine, N-cyclohexyl-2-benzothiazole sulfenamide; tetraethylenepentamine, etc.

The uncured halogenated butyl rubber may also be blended with about 1 to 10%, preferably 2 to 4% of a stabilizer such as a group II metal silicate, particularly calcium silicate, and/or with about 1 to 5%, preferably 2 to 4% of an adsorbent deactivator such as various high boiling polar compounds, e.g., ethylene glycol, during or preferably before the rubber is compounded with a pigment such as hydrated silica and curatives.

The amount of hydrated silica which may be added is, per 100 parts by weight of halogenated butyl rubber, generally about 10 to 50, preferably about 20 to 40 parts for tie-ply compositions, and somewhat higher, say about 20 to 100, preferably about 30 to 75 parts for compositions suitable for inner linings of tires. The amount of hydrated silica may be replaced with up to about 50% of a carbon black, preferably a thermal black for inner lining compositions or a channel black (or thermal black) for tie-ply compositions.

The nitrogen-containing organic vulcanization agents of the invention have an advantage when used in substantially lead-free brominated butyl rubber compositions. This is of importance because light-colored and especially white vulcanizates are made preferably omitting lead oxides and compounds containing lead and oxygen.

For vulcanization purposes, the halogenated copolymer before curing may be further compounded with various pigments or fillers such as clays, silica, alumina, titanium dioxide, talc, diatomaceous earth, etc., as well as with plasticizers which are preferably hydrocarbon plasticizer oils. Conventional antioxidants and mold release agents may be employed.

The vulcanization of the foregoing brominated butyl rubber compositions by nitrogen-containing organic compounds according to the present invention may be at temperatures from between about 200° F. to about 450° F., preferably at about 250° to 400° F. for from about several seconds up to about 5 hours or more. For most uses, the optimum vulcanization conditions are from about 0.5 minute to 5 hours at about 250° to 400° F.; the higher the vulcanization temperature, the shorter may be the vulcanizing time and vice versa.

The invention will be better understood from a consideration of the following experimental data:

BROMINATED BUTYL RUBBER "A"

Sixty grams of a commercial butyl rubber corresponding to GR-I-15 (i.e., Mooney viscosity at 212° F. for 8 minutes of 48 and a mole percent unsaturation of 1.8) were dissolved in 960 grams of carbon tetrachloride. Two milliliters of liquid bromine were then added and reaction was allowed to ensue for one hour at room temperature. The brominated rubbery polymer formed was then precipitated by the addition of excess isopropyl alcohol. In place of isopropyl alcohol, other known non-solvents for butyl rubber may be employed such as $C_1$ to $C_4$ alkanols, ketones such as acetone, etc. The rubbery polymer was then redissolved in hexane and reprecipitated with isopropyl alcohol. The brominated rubbery product was then dried at 65° C. under a vacuum of 0.1–2.0 inches of mercury absolute. The brominated product compared to the original polymer as follows.

Original polymer: Iodine No. (cg./g.) _____ 11.6
Brominated product: Iodine No. (cg./g.) 2.8 wt.
   percent combined bromine _____ 4.9

BROMINATED BUTYL RUBBER "B"

350 grams of a commercial butyl rubber known as Enjay Butyl-325 corresponding approximately to GR-I-25 rubber (i.e., Mooney viscosity at 212° F. for 8 minutes of 43 and a mole percent unsaturation of 2.3), were dissolved in 3,500 cc. of benzene. 51.2 grams of liquid bromine were then added over 0.5 hour and reaction was allowed to ensue for 120 minutes at 25° C. The brominated rubbery polymer formed was then precipitated by the addition of excess isopropyl alcohol, redissolved in hexane and reprecipitated, etc., for three times. The resulting brominated rubbery product was then dried at 60° C. under a vacuum of about 8 inches of mercury absolute. Upon examination, the brominated product was found to contain 5.0 weight percent combined bromine.

BROMINATED BUTYL RUBBER "C"

400 grams of a butyl rubber known as Enjay Butyl-325 corresponding approximately to GR-I-25 rubber were dissolved in 4,000 cc. of chloroform. 51 grams of liquid bromine were then added and reaction was allowed to ensue for 120 minutes at 26° C. The brominated rubbery polymer formed was then precipitated by the addition of excess isopropyl alcohol, redissolved in benzene, reprecipitated, etc., for three times and then dried at 60° C. under a vacuum of about 250 inches of mercury absolute. The resulting brominated product was examined and found to contain 6.0 wt. percent combined bromine.

BROMINATED BUTYL RUBBER "D"

The same general procedure as used in preparing brominated butyl rubber "B" was repeated except that 13 milliliters of liquid bromine were added to the butyl rubber solution, the reaction being for 90 minutes at 26° C. The brominated rubbery product, which was recovered in the same general manner as for brominated butyl rubber "B" was found to contain 1.6 weight percent combined bromine.

BROMINATED BUTYL RUBBER "E"

The same general procedure as for brominated butyl rubber "C" was repeated. The brominated rubbery product formed was found to contain 5.6 weight percent combined bromine.

BROMINATED BUTYL RUBBER "F"

The same general procedure as for brominated butyl rubber "B" was repeated except that 25 grams of liquid bromine were added to the butyl rubber solution, the reaction conditions and recovering procedure otherwise being the same. The brominated product formed was analyzed and found to contain 3.1 weight percent bromine.

CHLORINATED BUTYL RUBBER "N"

Three runs were made chlorinating butyl rubber. The butyl rubber employed in all instances was a commercial butyl rubber corresponding to GR-I-18 rubber. Such a rubber is produced by employing in the polymerization feed about 2.5 weight percent isoprene and about 97.5% isobutylene. The rubber had an eight minute Mooney viscosity at 212° F. of 71.0, a mole percent unsaturation of 1.47, and a viscosity average molecular weight of 420,000.

The chlorination of solutions of the above uncured butyl rubber was conducted in a 50 gallon glass-lined Pfaudler reactor equipped with agitator and baffle.

The solvent for the butyl rubber was as follows.

| Component: | Volume percent |
| --- | --- |
| 2,2-dimethyl butane | 0.1 |
| 2,3-dimethyl butane | 2.40 |
| 2-methyl pentane | 10.75 |
| 3-methyl pentane | 12.45 |
| n-Hexane | 44.85 |
| Methyl cyclopentane | 20.5 |
| 2,2-dimethyl pentane | 0.4 |
| Benzene | 7.7 |
| Cyclohexane | 0.85 |

Gaseous chlorine was continuously added to the butyl solutions over a period of 10 minutes at 30° C. and under atmospheric pressure. The chlorine was added to the reactor through a ⅜ inch stainless steel tube, one end of which was immersed below the liquid level of the agitated butyl rubber solutions. The agitated solutions were then allowed to stand for an additional 50 minutes.

The resulting solutions of chlorinated butyl rubber were then water-washed three times to remove dissolved hydrogen chloride. The solutions were then filtered to remove impurities as a precautionary measure.

The absolute amounts of butyl rubber, solvent, and chlorine added as well as the calculated percent of added chlorine based on polymer and resulting percent of chlorine combined in the polymer were as follows:

| Run No. | Pounds of butyl rubber | Gallons of solvent | Ounces of chlorine | Percent chlorine added | Percent chlorine combined in the polymer |
| --- | --- | --- | --- | --- | --- |
| 1 | 25 | 30 | 12 | 3.0 | 1.49 |
| 2 | 29 | 35 | 14 | 3.0 | 1.47 |
| 3 [1] | 29 | 35 | 19 | 4.1 | 1.68 |

[1] The chlorination in Run No. 3 was accomplished employing as the butyl rubber solvent 30 gallons of the above solvent and 5 gallons of the same solvent containing additionally about 1.2 volume percent of mixed $C_5$ olefins.

The resulting water-washed solutions containing the chlorinated rubbery butyl products of runs 1, 2 and 3 were then mixed. The chlorinated butyl rubber "N" was then recovered by injecting the dissolved chlorinated polymer into an agitated aqueous solution containing a commercial wetting agent of the aliphatic poly oxyethylene ether type (Sterox A.J.) in an amount of 64 cc. per 100 pounds of rubber as a dispersing aid. The solution also contained 1 pound of zinc stearate per 100 pounds of rubber and 0.2 pound of an antioxidant (2,6-di-tertiary butyl para cresol); the hot agitated aqueous solution being employed in an amount of 500 gallons per 100 pounds of rubber.

The agitated solution was maintained at a temperature between about 160° and 170° F. whereby to flash off the hydrocarbon solvent and form an aqueous slurry of the chlorinated butyl rubber in water. This slurry was then filtered and the chlorinated butyl "N" which was in the form of a wet "crumb" was placed in a Proctor and Schwartz tray drier maintained at 210° F. and dried for 6 hours. The crumb depth on the tray was about ½ inch. The crumb was completely dried and compacted by milling for eight minutes on a conventional rubber mill having a roll temperature of 250° F.

Screening tests carried out using the individual chlorinated rubbers of chlorinated butyl rubber "N" (runs 1-3) indicated substantially equal physical properties for each of the three individual chlorinated rubbers.

CHLORINATED BUTYL RUBBERS "O to Q"

The same general procedure employed in the preparation of the samples of runs 1, 2 and 3 of butyl rubber "N" was repeated except that the respective samples were recovered as chlorinated butyl rubber portions "O," "P" and "Q" (corresponding to samples 1, 2 and 3 respectively) by precipitation with acetone and drying in an oven under vacuum at 70° C. The absolute amounts of butyl rubber, hydrocarbon solvent and chlorine added as well as the calculated percent of added chlorine based on polymer and resulting percent of chlorine combined in the polymer were the same as for run nos. 1, 2 and 3 of chlorinated butyl rubber "N" as shown below:

| Chlorinated butyl | Pounds of butyl rubber | Gallons of solvent | Ounces of chlorine | Percent chlorine added | Percent chlorine combined in the polymer |
| --- | --- | --- | --- | --- | --- |
| "O" | 25 | 30 | 12 | 3.0 | 1.49 |
| "P" | 29 | 35 | 14 | 3.0 | 1.47 |
| "Q" | 29 | 35 | 19 | 4.1 | 1.68 |

In each of the above cases, the chlorinated butyl rubber is substantially free of oxygen and is satisfactory in curing ability, adhesion to natural rubber, compatibility with natural rubber and GR-S rubber. The heat aging characteristics are also satisfactory. The molecular weight of the copolymers are also not substantially degraded.

Obviously, other examples of copolymers of isobutylene, dimethyl fulvene and isoprene; or isobutylene, and styrene with isoprene, etc., may likewise be employed within the purview of the present invention. The addition of carbon black as the particular filler prior to vulcanization is an optical embodiment but is preferred unless the butyl rubber is to be other than a black rubber. The use of stearic acid as a mold release agent in amounts of about 1 to 5% is likewise an optional embodiment.

CHLORINATED BUTYL RUBBER "R"

A chlorinated butyl rubber copolymer was prepared by halogenating a butyl rubber copolymer of 98.2% isobutylene and 1.8% isoprene to give a halogenated copolymer of about 1.2 weight percent combined chlorine, having a mole percent unsaturation of 1.5 and a specific gravity of 0.92. The halogenated copolymer had a viscosity average molecular weight of about 450,000 and a Mooney viscosity of 52±8. Chlorination was accomplished by treating a solution of the butyl rubber in an aliphatic solvent with gaseous chlorine.

Example 1

One hundred parts by weight of brominated butyl rubber "B" were compounded on a two roll commercial rubber mill at a roll temperature of 100° F. with the following.

| Component: | Parts by wt. |
|---|---|
| Carbon black (SRF) | 50 |
| Mold release agent (stearic acid) | 0.5 |
| Organic nitrogen-containing curing agent (i.e., n-decylamine) | 5.8 |

The resulting compounded brominated rubbery blend formed was then cured for 40 minutes at 287° F. in order to vulcanize the same, the following inspections being noted.

Property:
- Tensile strength (p.s.i.) _____ 1740
- Elongation (percent) _____ 550
- Modulus at 100% elongation (p.s.i.) _____ 170

The above data show that an organic nitrogen-containing compound (i.e., a primary amine) cures brominated butyl rubber, in accordance with the invention, into a vulcanizate having desirable physical properties in the absence of conventional curatives.

Example 2

The same general procedure as in Example 1 was repeated by compounding brominated butyl rubber "B" on a rubber mill into the following compositions:

| Component | Parts by weight | | |
|---|---|---|---|
| | Sample A | Sample B | Sample B' |
| Brominated butyl rubber "B" | 100 | 100 | 100 |
| Carbon black (SRF) | 50 | 50 | 50 |
| Mold release agent (stearic acid) | 0.5 | 0.5 | 0.5 |
| Magnesium oxide | 5.0 | | 5.0 |
| n-Decylamine | 1.5 | | |

The above compounded butyl rubber blends were then cured for 120 minutes at 315° F. The following physical inspections were noted:

| Property | Sample A | Sample B | Sample B' |
|---|---|---|---|
| Tensile strength (p.s.i.) | 1,500 | No cure | No cure. |
| Elongation (percent) | 400 | ---do--- | Do. |
| Modulus at 300% elong. (p.s.i.) | 1,150 | ---do--- | Do. |

The above data show that a combination of an organic nitrogen-containing compound (i.e., N-decylamine) in accordance with the invention cures brominated butyl rubber in the presence of magnesium oxide into a high quality vulcanizate. As shown magnesium oxide alone will not produce a vulcanizate and, therefore, cannot be considered a cross-linking agent. The data show that the omission of the organic nitrogen-containing compound (i.e., n-decylamine) with or without the omission of magnesium oxide, results in no cure (i.e., samples B and B') although the brominated butyl rubber was otherwise compounded in the same manner and heated at the same temperature level for the same period of time as in sample A.

Example 3

The same general procedure as in Example 2, sample A was repeated except that the brominated butyl rubber employed was brominated butyl rubber "C" containing 6.0 weight percent bromine (instead of 5.0 weight percent bromine as in brominated butyl rubber "B"). Upon compounding and curing in the same manner as in Example 2 (except that 5.0 parts by weight of n-decylamine were employed), the following physical inspections were noted.

Property:
- Tensile strength (p.s.i.) _____ 1200
- Elongation (percent) _____ 320
- Modulus at 300% elongation (p.s.i.) _____ 1180

The above data show that comparable physical characteristics of the cured vulcanizates are obtained with varied amounts of organic nitrogen-containing compound (n-decylamine), i.e., from 1.5 to 5.0 parts by weight, and with brominated butyl rubbers of varied halogen content (6.0 weight percent rather than 5.0 weight percent as in Example 2).

Example 4

Four additional samples, i.e., samples C, D, E, and F (each containing 100 parts by weight) of brominated butyl rubber "C" were compounded on a rubber mill with the same ingredients and in the same general manner as described in Example 3. The compounded stocks were then cured for various periods of time at a temperature level of 280° F., the following inspections being noted:

| | Sample | | | |
|---|---|---|---|---|
| | C | D | E | F |
| Cure time (minutes) | 15 | 30 | 60 | 120 |
| Tensile strength (p.s.i.) | 1,700 | 1,720 | 1,750 | 1,600 |
| Elongation (percent) | 590 | 560 | 500 | 400 |
| Modulus at 300% elong. (p.s.i.) | 750 | 950 | 1,050 | 1,150 |

The above data show that the vulcanization time employing organic nitrogen-containing compounds such as n-decylamine, in accordance with the present invention, may be varied over a considerable period of time. More particularly, the data show that vulcanizates having good tensile strengths, elongations, and moduli are produced when the curing time is varied between a period of between about 15 minutes and 2 hours.

Example 5

The same general procedure as in Example 4, sample D, was repeated in two runs (i.e., runs G and H) except that in run G the brominated butyl rubber employed was brominated butyl rubber "D" whereas in run H the brominated butyl rubber employed was brominated butyl rubber "E."

After compounding each rubber in the same general manner as in Example 4, run D, and curing the same for 30 minutes at 280° F., the following physical inspections were noted:

| Property | Run G (1.6% bromine) | Run H (5.6% bromine) |
|---|---|---|
| Tensile strength (p.s.i.) | 1,020 | 1,600 |
| Elongation (percent) | 380 | 490 |
| Modulus at 300% elong. (p.s.i.) | 850 | 940 |

The above data show that high quality vulcanizates of brominated butyl rubber are obtained even though the percent bromine in the brominated butyl copolymer is varied between about 1.6 to 5.6 weight percent when the butyl rubber brominated corresponded to GR–I–25 rubber. It will be noted for this rubber, that the higher proportion of bromine (i.e., about 5.6 weight percent based on copolymer) produces a vulcanizate having a higher tensile strength of 1600 p.s.i. compared to the tensile strength of 1020 p.s.i. for the vulcanizate containing only about 1.6% bromine.

Example 6

The same general procedure as in Example 1 was repeated except that samples of brominated butyl rubbers "B" and "F" respectively were compounded into the following recipes:

|  | Parts by weight | |
|---|---|---|
|  | Sample I | Sample J |
| Brominated butyl rubber "B" (containing 5.0 weight percent bromine) | 100 |  |
| Brominated butyl rubber "F" (containing 3.1 weight percent bromine) |  | 100 |
| Carbon black (SRF) | 50 | 50 |
| Magnesium oxide | 5.0 | 5.0 |
| Hexamethylene diamine | 0.7 | 0.7 |
| Stearic acid | 0.5 | 0.5 |

The above compounded brominated butyl rubber blends were then cured for 60 minutes at 300° F., the following physical inspections being noted:

| Property | Sample I | Sample J |
|---|---|---|
| Tensile strength (p.s.i.) | 1,450 | 1,200 |
| Elongation (percent) | 340 | 250 |
| Modulus at 100% elong. (p.s.i.) | 220 | 290 |

The above data show that an organic diamine vulcanizing agent cures brominated butyl rubber in accordance with the present invention into high quality vulcanizates each having a satisfactory tensile strength, elongation, and modulus.

*Example 7*

The same general procedure as in Example 1 was repeated except that 100 parts by weight of brominated butyl rubber "C" (containing 6 weight percent combined bromine) were blended on a rubber mill with 50 parts of SRF carbon black, 1.0 part stearic acid, 5.0 parts magnesium oxide and 3.0 parts diethylene triamine as the vulcanizing agent. This compounded brominated butyl rubber blend was then cured for 15 minutes at 300° F. The following physical inspections were noted.

Property:
  Tensile strength (p.s.i.) _____ 1350
  Elongation (percent) _____ 310
  Modulus at 300% elong. (p.s.i.) _____ 1250

The above data show that an organic nitrogen-containing compound in accordance with the present invention (diethylene triamine) cures brominated butyl rubber into a high quality vulcanizate having good tensile strength, elongation, and modulus.

*Example 8*

One hundred parts by weight of brominated butyl rubber "A" (containing 2.8% combined bromine) were compounded on a rubber mill in the same general manner as described in Example 1 with the following.

Components:                              Parts by weight
  Carbon black (SRF) _____ 50
  Stearic acid _____ 1.0
  Ethylene thiourea _____ 1.5

The resulting compounded brominated butyl rubber blend formed was then cured for 60 minutes at 300° F. in order to vulcanize the same, the following inspections being noted.

Property:
  Tensile strength (p.s.i.) _____ 1350
  Elongation (percent) _____ 560
  Modulus at 300% elong. (p.s.i.) _____ 675

The above data show that an organic nitrogen-containing compound in accordance with the present invention (ethylene thiourea) cures brominated butyl rubber in the absence of sulfur, zinc oxide or other conventional curatives into a high quality vulcanizate having satisfactory tensile strength, elongation, and modulus.

*Example 9*

In order to demonstrate the fact that brominated butyl rubber may be chemically modified by the use of compounds containing in addition to an NH group or groups and/or an NH₂ group or groups, other functional groups, brominated butyl rubber "C" was compounded on a rubber mill into the following recipe.

Component:                                Parts by weight
  Brominated butyl rubber "C" (containing 6.0% bromine) _____ 100
  Organic nitrogen - containing vulcanization agent (i.e., n-decylamine) _____ 4.5
  Modifying organic nitrogen-containing compound containing NH₂ and/or NH groups and at least one other functional group (e.g., p-amino benzoic acid) _____ 4.0
  Carbon black (SRF) _____ 50
  Magnesium oxide _____ 5.0
  Stearic acid _____ 0.5

The resulting compounded brominated butyl rubber blend formed was then cured for 60 minutes at 300° F. in order to vulcanize the same. The following inspections were noted.

Property:
  Tensile estrength (p.s.i.) _____ 1530
  Elongation (percent) _____ 250
  Modulus at 100% elongation (p.s.i.) _____ 580

The above data show that by including in the vulcanization mixture in addition to an organic nitrogen-containing compound capable of vulcanizing brominated butyl rubber, another organic nitrogen-containing compound containing other functional substituents, improved vulcanizates having comparable tensile strength, elongation and much higher modulus are obtained. For instance, brominated butyl rubber culcanizates cured with n-decylamine in the absence of an organic nitrogen-containing compound having other substituents (e.g., p-amino benzoic acid) exhibit moduli at 100% elongation between about 100 to 300 p.s.i. compared to the modulus obtained in the present example at 100% elongation of 580 p.s.i.

*Example 10*

In order to demonstrate that halogenated butyl rubber cured by the use of the amine compounds of the present invention gives vulcanizates of superior properties, particularly as to ozone resistance, as compared with the use of conventional curatives, chlorinated butyl rubber "R" was compounded on a rubber mill into the following recipes:

| Component | Parts by weight | |
|---|---|---|
|  | Run 1 | Run 2 |
| Chlorinated butyl rubber "R" | 100 | 100 |
| HAF black | 50 | 50 |
| Stearic acid | 1 | 1 |
| Antioxidant 2,2'-methylene-bis(6-tertiary butyl-p-cresol) | 1 | 1 |
| Zinc oxide | 5 | 0 |
| Sulfur | 2 | 0 |
| Altax (benzothiazyl disulfide) | 1 | 0 |
| Diethylene triamine | 0.5 | 2 |

Portions of the recipes of runs 1 and 2 were then cured for 30 and 60 minutes at 300° F. The following inspections were noted:

|  | 30 mins. at 300° F. | | 60 mins. at 300° F. | |
|---|---|---|---|---|
|  | Run 1 | Run 2 | Run 1 | Run 2 |
| Tensile strength (p.s.i.) | 1,250 | 1,650 | 1,830 | 2,050 |
| Elongation (percent) | 615 | 390 | 550 | 315 |
| Modulus at 100% elong. (p.s.i.) | 650 | 1,240 | 1,025 | 1,970 |
| Ozone resistance:[1] |  |  |  |  |
|   Time to crack, minutes |  |  | 8 | 19 |
|   Time to break, minutes | 120 | 184 | 90 | 194 |

[1] As measured by contact with an atmosphere of 0.2% ozone.

As shown from the above data, vulcanizates formed by using an amine compound of the present invention as the sole curing agents (run 2) showed substantially greater resistance to ozone than a conventional curing system containing sulfur and zinc oxide (and employing an amine as a vulcanization accelerator). Moreover, at cure times of 30 and 60 minutes, the organic nitrogen-containing cure gave a vulcanizate of superior tensile properties. The data shows that the present invention is concerned with more than the mere omission of conventional curing agents and their corresponding function.

*Example 11*

To further illustrate the advantages of the cure of the present invention, a comparison was made with respect to ozone resistance of vulcanizates obtained by the use of various cure systems.

In all of the following formulations, 100 parts by weight of chlorinated butyl "R" and 50 parts by weight of HAF carbon black, were compounded with the following:

[All values in parts by weight]

|  | Zinc oxide cure | Thiuram disulfide cure | Sulfur cure | Quinone dioxime cure | Amine cure |
|---|---|---|---|---|---|
| Antioxidant 2246 [1] | 1.0 | 1.0 | | | 1.0 |
| Stearic acid | 1.0 | 1.0 | 0.5 | 1.0 | |
| Zinc oxide | 5.0 | 5.0 | 5.0 | 5.0 | |
| Tetramethyl thiuram disulfide | | 1.0 | | | |
| Sulfur | | | 2.0 | | |
| Tellurium diethyldithiocarbamate | | | 1.0 | | |
| Lead oxide | | | | 2.0 | |
| Quinone dioxime | | | | 2.0 | |
| Benzothiazyl disulfide | | | | 4.0 | |
| Diethylene triamine | | | | | 2.0 |
| Magnesium oxide | | | | | 5.0 |

[1] Trade name of 2,2'-methylene-bis(6-tertiary butyl-p-cresol).

The recipes were then steam cured for 20 minutes at 320° F. The resulting vulcanizates were thereafter evaluated in an atmosphere of 0.2% ozone and at 50% elongation (accelerated ozone test) and gave the following results:

|  | Cure system | | | | |
|---|---|---|---|---|---|
|  | Zinc oxide | Thiuram disulfide | Sulfur | Quinone dioxime | Amine |
| Minutes to crack in ozone | 57 | 55 | 28 | 57 | 250 |

The above results show that vulcanizates obtained by using organic nitrogen-containing compounds of the present invention exhibit considerably better ozone resistance than would be obtained by utilizing conventional cure systems.

*Example 12*

One hundred parts by weight of chlorinated butyl rubbers "O," "P" and "Q" were each compounded on a two-roll commercial rubber mill at a roll temperature of 100° F. with the following.

| Component: | Parts by wt. |
|---|---|
| Zinc oxide | 5 |
| Carbon black (SRF) | 50 |
| Stearic acid | 1 |

An additional 100 parts by weight of chlorinated butyl rubber "O" (hereinafter referred to as chlorinated butyl rubber "$O_1$") was then compounded on the same two-roll commercial rubber mill at a roll temperature of 100° F. with the following.

| Component: | Parts by wt. |
|---|---|
| Hexamethylene diamine (vulcanization agent) | 2.2 |
| Carbon black (SRF) | 50 |
| Stearic acid (mold release agent) | 1 |

The resulting compounded chlorinated butyl rubber blends formed were then cured for 60 minutes at 287° F. in order to vulcanize the same. The following inspections were noted:

| Property | Chlorinated butyl rubber | | | |
|---|---|---|---|---|
|  | "O" | "P" | "Q" | "$O_1$" |
| Tensile strength (p.s.i.) | 1,600 | 1,920 | 1,715 | 2,200 |
| Modulus at 300% elong. (p.s.i.) | 910 | 1,180 | 1,080 | 1,440 |
| Elongation (percent) | 460 | 405 | 395 | 405 |

The above data show that a typical nitrogen-containing organic compound of the present invention, i.e., hexamethylene diamine, cures chlorinated butyl rubber to a vulcanizate "$O_1$" having a superior tensile strength of 2200 p.s.i. as compared to a zinc oxide cure which produced vulcanizates "O," "P" and "Q" having a tensile strengths of between about 1600 and 1900 p.s.i.

*Example 13*

The following compositions (containing chlorinated butyl rubber "N" and an organic nitrogen-containing compound) were also compounded on a rubber mill in the same general manner described as in Example 12.

[Parts by weight]

| Component | Sample | | | | |
|---|---|---|---|---|---|
|  | 1 | 2 | 3 | 4 | 5 |
| Chlorinated butyl rubber "N" | 100 | 100 | 100 | 100 | 100 |
| Carbon black (SRF) | 50 | 50 | 50 | 50 | 50 |
| Hexamethylene diamine | 2 | 4 | | | |
| p-Phenylene diamine | | | 2 | 4 | |
| Stearic acid | 0.5 | 0.5 | 0.5 | 0.5 | 0.5 |
| Magnesium oxide | 5.0 | 5.0 | 5.0 | 5.0 | 5.0 |

The above compounded chlorinated butyl rubber blends were then cured for 30 minutes at 280° F. The following physical inspections were noted:

| Property | Sample | | | | |
|---|---|---|---|---|---|
|  | 1 | 2 | 3 | 4 | 5 |
| Tensile strength (p.s.i.) | 1,150 | 1,370 | 1,150 | 1,450 | No cure. |
| Elongation (percent) | 640 | 680 | 650 | 620 | Do. |
| Modulus at 300% elong. (p.s.i.) | 400 | 400 | 400 | 550 | Do. |

The above data show that vulcanization under relatively mild conditions (particularly for butyl rubber) in accordance with the invention employing organic nitrogen-containing compounds (e.g., hexamethylene diamine, p-phenylene diamine) in conjunction with magnesium oxide produces vulcanizates having excellent tensile strengths of substantially in excess of 1000 p.s.i. (i.e., 1150 to 1450 p.s.i.). A blend in which the recipe included magnesium oxide, but not organic nitrogen-containing compounds, did not vulcanize thus showing that magnesium oxide is not a cross-linking agent under conventional curing conditions.

*Example 14*

One hundred parts by weight of chlorinated butyl rubber "N" were compounded on a two-roll commercial rubber mill with various organic nitrogen-containing compounds in the absence of magnesium oxide as follows:

| Component | Parts by weight | |
|---|---|---|
| | Sample 5 | Sample 6 |
| Chlorinated butyl rubber "N" | 100 | 100 |
| p-Phenylene diamine | 1 | |
| Hexamethylene diamine | | 2.2 |
| Carbon black (SRF) | 50 | 50 |
| Stearic acid | 0.5 | 0.5 |

The above compounded chlorinated butyl rubbers were then cured for 40 minutes at 287° F. in order to vulcanize the same. The following physical inspections were noted:

| Property | Sample 5 | Sample 6 |
|---|---|---|
| Tensile strength (p.s.i.) | 1,030 | 1,500 |
| Elongation (percent) | 460 | 500 |
| Modulus at 300% elong. (p.s.i.) | 550 | 650 |

The above data show that chlorinated butyl rubber may be cured at relatively low temperatures and short curing times employing various organic nitrogen-containing compounds without any added basic metal compound such as magnesium oxide.

*Example 15*

One hundred parts by weight of chlorinated butyl rubber "N" were compounded into various samples on a two-roll commercial rubber mill at 100° F. as follows.

Component:                  Samples 1 and 2
    Chlorinated butyl rubber "N" _____ 100
    Decylamine _____ 5
    Magnesium oxide _____ 5
    Carbon black (SRF) _____ 50
    Stearic acid _____ 0.5

Compounded chlorinated butyl rubber sample 1 was then cured for 120 minutes at 280° F.; compounded chlorinated butyl rubber sample 2 being cured for 180 minutes at the same temperature level. The following physical inspections were noted:

| Property | Sample 1 | Sample 2 |
|---|---|---|
| Tensile strength (p.s.i.) | 1,130 | 1,400 |
| Elongation (percent) | 550 | 590 |
| Modulus at 300% elong. (p.s.i.) | 470 | 500 |

The above data show that good vulcanizates of chlorinated butyl rubber are obtained employing a monofunctional primary amine (decylamine) in the absence of added sulfur or zinc oxide.

*Example 16*

One hundred parts by weight of various samples of chlorinated butyl rubber "N" were compounded on a rubber mill into the following compositions.

Component:                     Parts by wt.
    Chlorinated butyl rubber "N" _____ 100
    Carbon black (SRF) _____ 50
    2-mercaptoimidazoline _____ 2
    Magnesium oxide _____ 5
    Stearic acid _____ 0.5

The resulting compounded chlorinated butyl rubber blend was then cured for 60 minutes at 300° F., the following physical inspections being noted.

Property:
    Tensile strength (p.s.i.) _____ 1720
    Elongation (percent) _____ 520
    Modulus at 300% elong. (p.s.i.) _____ 820

The above data show that 2-mercaptoimidazoline is an effective curing agent for halogenated butyl rubber. A similar blend in which the recipe included magnesium oxide but not an organic nitrogen-containing compound such as 2-mercaptoimidazoline, did not vulcanize.

*Example 17*

One hundred parts by weight of chlorinated butyl rubber "N" were compounded into various metal-oxide-free compositions on a rubber mill as follows:

| Component | Parts by weight | |
|---|---|---|
| | Sample 4 | Sample 5 |
| Chlorinated butyl rubber "N" | 100 | 100 |
| Carbon black (SRF) | 50 | 50 |
| 2-Mercaptoimidazoline | 2.0 | |
| Hexamethylene tetramine | | 2.0 |
| Stearic acid | 0.5 | 0.5 |

The resulting compounded chlorinated butyl rubber blends were then cured for 60 minutes at 300° F.; the following physical inspections being noted:

| Property | Sample 4 | Sample 5 |
|---|---|---|
| Tensile strength (p.s.i.) | 1,700 | 1,280 |
| Elongation (percent) | 510 | 520 |
| Modulus at 300% elongation (p.s.i.) | 1,320 | 550 |

The above data show that typical organic nitrogen-containing compounds employed in accordance with the invention in sulfur-free and metal oxide-free cures produce satisfactory vulcanizates of chlorinated butyl rubber.

As shown by the above examples, use of the organic nitrogen-containing compounds as the sole cross-linking agent yields high quality vulcanizates, showing improved properties particularly as to ozone resistance over conventional butyl rubber cure systems.

The compositions of halogenated butyl rubber with organic nitrogen-containing compounds, in accordance with the present invention, may be employed for a wide variety of applications such as for tubeless or inner tube containing tires, electrical insulation, tire curing bags or bladders, inner tubes, car window channel strips, blown sponge rubber, conveyor and transmission belting, proofed goods, and other applications where butyl rubber has utility.

Resort may be had to modifications and variations without departing from the spirit of the present invention or the scope of the appended claims.

What is claimed is:

1. A composition comprising the reaction product of an isoolefin-multiolefin butyl rubber copolymer with a halogenating agent, said copolymer containing at least about 0.5 weight percent halogen on the basis of the total weight of the copolymer but not more than about 3 combined atoms of halogen per double bond in the copolymer, and a minor proportion of an organic nitrogen-containing compound as the sole cross-linking agent, said compound being selected from the group consisting of $C_4$ to $C_{24}$ aliphatic hydrocarbon amines, aromatic hydrocarbon amines, guanamines, alkylene thioureas, melamine, alkyl melamines, diamino pyridines, and mixtures thereof.

2. A rubber tire which contains an isoolefin-multiolefin butyl rubber copolymer which has been vulcanized in the presence of a minor proportion of magnesium oxide, and an organic nitrogen-containing compound as the sole cross-linking agent, said compound being as defined in claim 1, said butyl rubber copolymer having been combined, prior to vulcanization, with at least about 0.5 weight percent halogen on a basis of the total weight of the copolymer but not more than about 2 combined atoms of halogen per double bond in said copolymer.

3. A composition comprising a rubbery polymer of a Staudinger molecular weight of above about 30,000 containing atoms of hydrogen, carbon and halogen and having in its structure a major proportion of saturated hydrocarbon units derived by the polymerization of iso-olefins containing about 4 to 8 carbon atoms, and also containing sufficient units in which a pair of carbon atoms is linked by an olefinic double bond that the mole percent unsaturation of the polymer is from about 0.5 to 25.0; said polymer containing at least about 0.5 weight percent halogen but not more than about 3 combined atoms of halogen per double bond in the polymer; said polymer being in composition with a minor proportion of magnesium oxide, and a minor proportion of an organic nitrogen-containing compound as the sole cross-linking agent, said compound being selected from the group consisting of $C_4$ to $C_{24}$ aliphatic hydrocarbon amines, aromatic hydrocarbon amine, guanamine, alkylene thioureas, melamine, alkyl melamines, diamino pyridines, and mixtures thereof.

4. The composition of claim 3 wherein said halogen is chlorine and said polymer contains not more than 1 combined atom of chlorine per double bond in the copolymer.

5. The composition of claim 3 wherein said halogen is bromine.

6. A vulcanized composition comprising a chlorinated butyl rubber copolymer, said copolymer containing a major portion of a $C_4$ to $C_7$ isoolefin, a minor portion of a $C_4$ to $C_{14}$ multiolefin, and at least 0.5 wt. percent, but not more than 1 atom of combined chlorine per double bond in the copolymer; a minor proportion of magnesium oxide; and a minor proportion of an organic nitrogen-containing compound as the sole crosslinking agent, said compound being selected from the group consisting of $C_4$ to $C_{24}$ aliphatic hydrocarbon amines, aromatic hydrocarbon amines, guanamines, alkylene thioureas, melamine, alkyl melamines, diamino pyridines, and mixtures thereof.

References Cited in the file of this patent
UNITED STATES PATENTS

| | | |
|---|---|---|
| 2,304,637 | Hardy | Dec. 8, 1942 |
| 2,451,174 | Reuter | Oct. 12, 1948 |
| 2,944,578 | Baldwin et al. | July 12, 1960 |
| 2,964,489 | Baldwin et al. | Dec. 13, 1960 |